United States Patent [19]
Barley et al.

[11] Patent Number: 5,466,044
[45] Date of Patent: Nov. 14, 1995

[54] CHILD SAFETY SEAT

[75] Inventors: Geoffrey W. Barley, Pitton; Norman Morton, Driffield, both of England

[73] Assignee: Britax-Excelsior Limited, England

[21] Appl. No.: 300,950

[22] Filed: Sep. 6, 1994

[30] Foreign Application Priority Data

Sep. 30, 1993 [GB] United Kingdom ............... 9320169

[51] Int. Cl.⁶ ................................................. A47C 1/08
[52] U.S. Cl. .................... 297/252; 297/250.1; 297/253
[58] Field of Search .................... 297/250.1, 216.1, 297/216.11, 252, 253, 256.15; 296/63

[56] References Cited

U.S. PATENT DOCUMENTS

| | | | |
|---|---|---|---|
| 2,624,394 | 1/1953 | De Milto | 297/352 |
| 2,904,102 | 9/1959 | Komori | 297/250.1 |
| 3,349,413 | 10/1967 | Merelis | 297/253 X |
| 5,197,176 | 3/1993 | Reese | 29/278 |

FOREIGN PATENT DOCUMENTS

| | | | |
|---|---|---|---|
| 503602 | 9/1978 | Australia. | |
| 631611 | 11/1961 | Canada | 297/252 |
| 0485121 | 5/1992 | European Pat. Off.. | |
| 0619201 | 10/1994 | European Pat. Off.. | |
| 2844189 | 4/1980 | Germany | 297/250.1 |
| 8527245 | 1/1986 | Germany. | |
| 9010907 | 7/1990 | Germany. | |
| 7515104 | 6/1976 | Netherlands | 297/216.11 |

Primary Examiner—Kenneth J. Dorner
Assistant Examiner—Milton Nelson, Jr.
Attorney, Agent, or Firm—Davis, Bujold & Streck

[57] ABSTRACT

A child safety seat for use in a vehicle, comprising a seat body (10), and two S-shaped coupling arms (36, 38), each of which is pivotally mounted at one end (46, 48) to the seat body (10) below the front thereof and has a front releasable fastener (58, 60) on its other end (54, 56) for attachment to a front anchorage unit located below the front edge of a vehicle seat (18). The coupling arm (36, 38) is so shaped that an intermediate portion (40, 42) thereof is located in front of both ends (46, 48; 54, 56) thereof when the front releasable fastener (58, 60) is engaged with the front anchorage unit, so as to extend round the front edge of the vehicle seat (18).

4 Claims, 3 Drawing Sheets

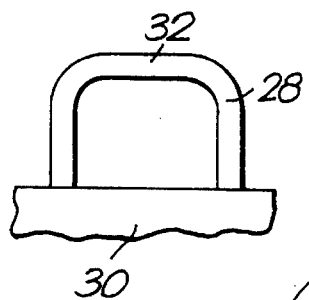
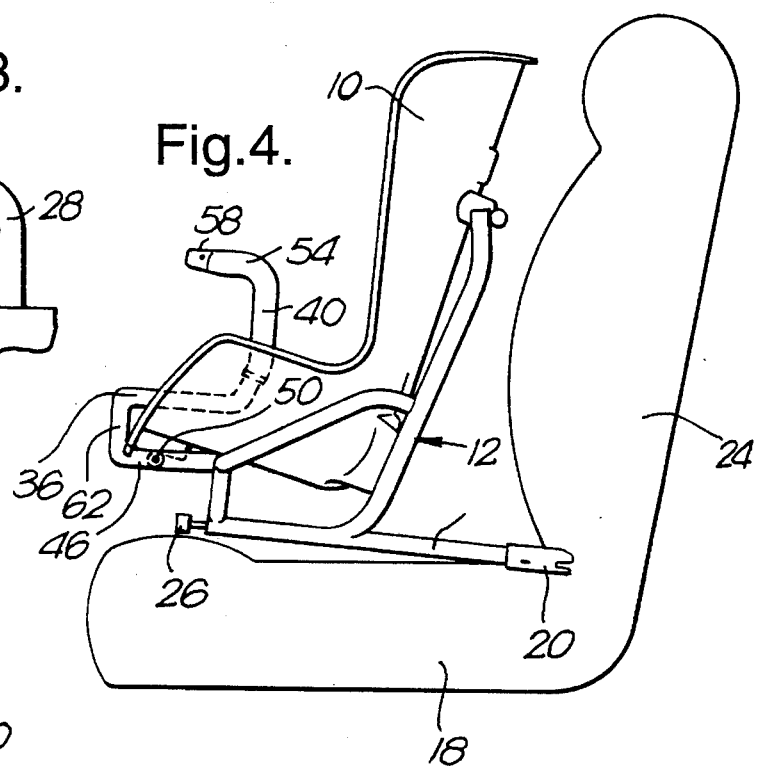
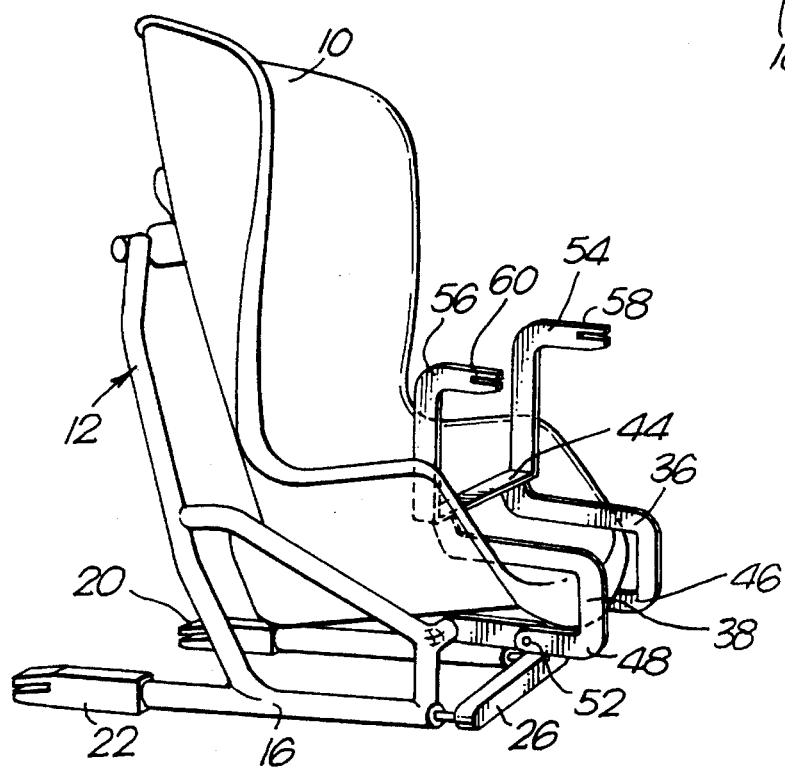

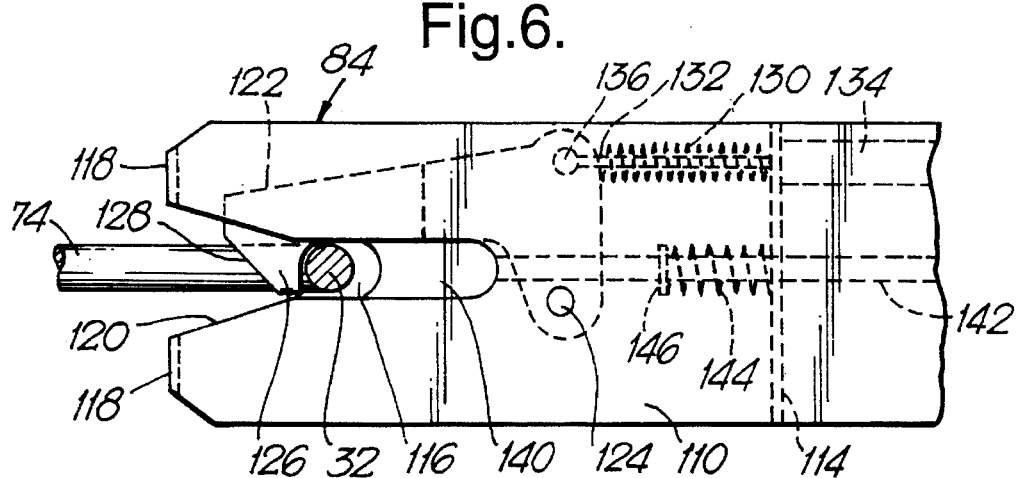
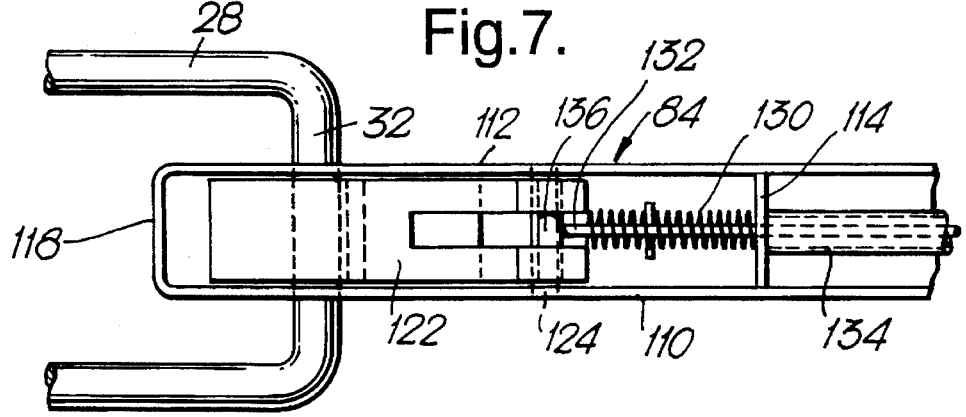
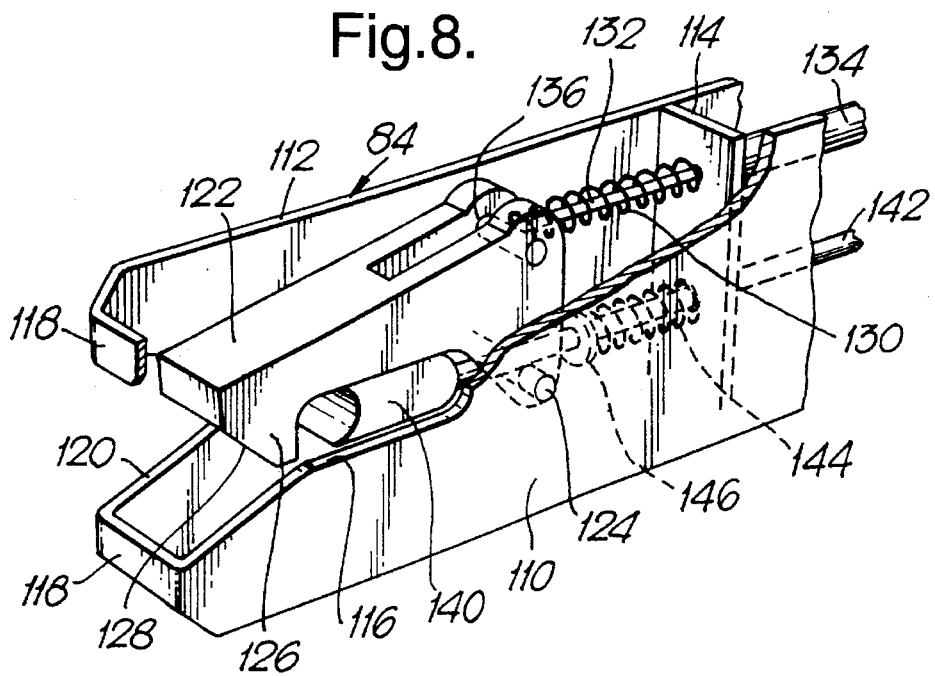

CHILD SAFETY SEAT

FIELD

This invention relates to a child safety seat for use in a vehicle, of the type comprising a seat body and releasable coupling means for securing the seat body to the vehicle.

RELATED ART

The disadvantage of mounting a child seat in a vehicle by resting it on a vehicle seat and securing it in place with straps arises from the inherent resilience of the springs and upholstery of the vehicle seat and also from the resilience of the straps themselves. Even if the straps securing the child seat are pulled very tight during installation, such resilience will permit undesirable movement of the child seat relative to the vehicle in the event of sudden deceleration, for example during an accident. In order to overcome this disadvantage, it has been proposed to provide motor cars with standard anchorage units at agreed locations for engagement by releasable connectors which are rigidly coupled to a child seat. Proposals under discussion at the present time involve the location of at least one such standard anchorage unit below the front edge of the vehicle seat and close to the floor of the vehicle. The present invention is concerned with the provision of a child seat of the type described above for attachment to such anchorage units.

SUMMARY OF THE INVENTION

According to the invention, in a child safety seat of the type described above, the releasable coupling means includes a coupling arm pivotally mounted at one end to the seat body below the front thereof and having a front releasable fastener on its other end for attachment to a front anchorage unit located below the front edge of a vehicle seat, the coupling arm being so shaped that an intermediate portion thereof is located in front of both ends thereof when the front releasable fastener is engaged with the front anchorage unit.

The coupling arm may be S-shaped.

It should be understood that reference to the front of the child seat means the front of the seat in relation to the direction of travel of the vehicle. If the invention is applied to a rearward facing child seat, the coupling arm would be attached to the seat body in the region of the backrest thereof.

BRIEF DESCRIPTION OF THE DRAWINGS

FIG. 3 is a scrap view of a standard anchorage unit for permanent attachment to a vehicle body;

FIG. 4 is a side view of the child seat shown in FIGS. 1 and 2 with its support member in a position ready for removal of the child seat from the vehicle;

FIG. 5 is a perspective view similar to FIG. 2 but with the support member in the position shown in FIG. 4;

FIG. 6 is a side view of a buckle for securing the child seat shown in FIGS. 1 and 2 to a vehicle;

FIG. 7 is a plan view of the buckle shown in FIG. 6; and

FIG. 8 is a partially broken away perspective view of the buckle shown in FIGS. 6 and 7.

DETAILED DESCRIPTION OF THE PREFERRED EMBODIMENT

Figure 1:
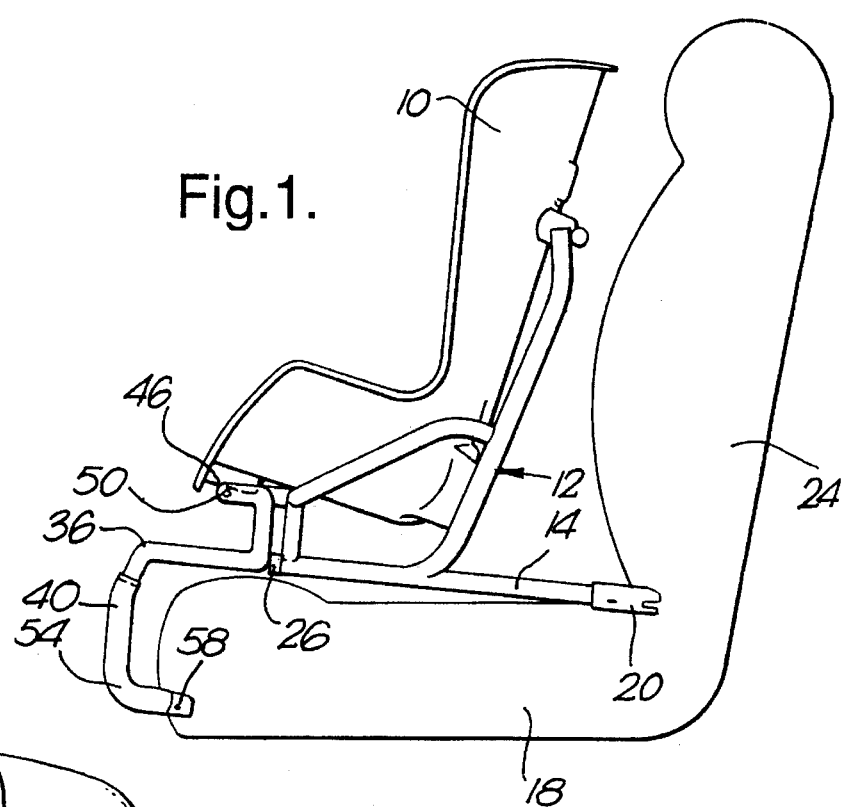
FIG. 1 is a schematic side view of a child seat in accordance with their invention fitted to a vehicle seat.
Figure 2:
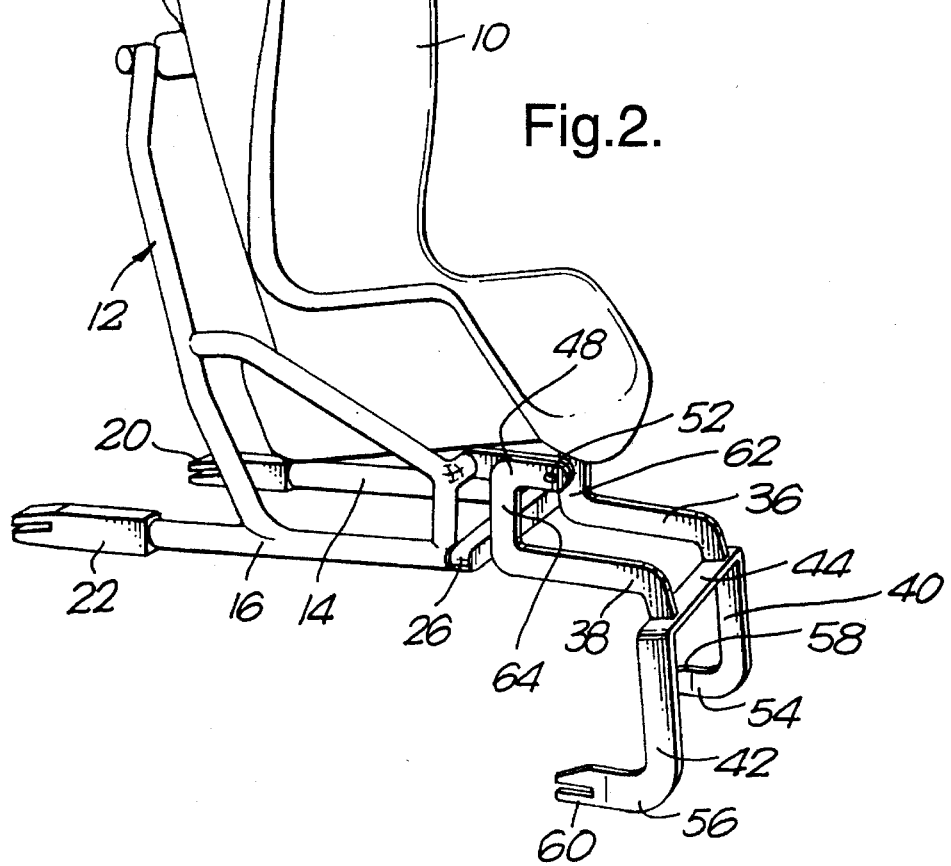
FIG. 2 is a perspective view of the child seat with its support member in the orientation shown in FIG. 1.

The child seat shown in FIGS. 1 and 2 comprises a rigid seat shell 10 mounted on a tubular metal frame 12. The seat 10 has a harness (not shown) for the child which is of conventional type, consisting of shoulder straps, lap straps and a crotch strap, as described in AU-B-503603.

The support frame 12 includes a pair of horizontal members 14 and 16 which are intended in use to be located on or slightly above a vehicle seat squab 18. At their rear ends, the members 14 and 16 have respective buckles 20 and 22 on their rear ends for engagement with standard anchorage units located between the seat squab 18 and the seat back 24 of the vehicle seat. A release bar 26, extending between the front ends of the members 14 and 16, is coupled so that forward movement thereof causes the buckles 20 and 22 to disengage.

Referring to FIG. 3, one form of standard anchorage unit comprises a generally U-shaped rod-like member 28 secured to a part 30 of the vehicle body by the ends of its limbs and with its central portion 32 oriented to extend in a general horizontal direction transversely of the vehicle.

In accordance with the invention, the seat shell also has a front frame comprising two S-shaped members 36 and 38 having intermediate parts 40 and 42 interconnected by a transverse member 44. The two S-shaped members 36 and 38 are connected at their upper ends 46, 48 to the underside of the front edge of the seat shell 10 by respective pivot joints 50 and 52. At their lower ends 54, 56, each of the S-shaped members carries a respective buckle 58, 60 for engagement with standard anchorages located below the front edge of the vehicle seat squab 18. When the releasable coupling means 58, 60 are so engaged, the intermediate parts 40, 42 of the S-shaped members 36 and 38 extend round the front edge of the vehicle seat squab 18 while both ends 46, 48, 54, 56 thereof are behind such front edge. The vertical parts 62 and 64 of the S-shaped members 36 and 38 adjacent to the upper ends 46 and 48, obstruct movement of the release bar 26.

Referring to FIGS. 4 and 5, when the child seat 10 is to be removed from the vehicle, the front buckles 58 and 60 are released and the S-shaped members 36 and 38 folded upwards to the positions illustrated in FIG. 4. The release bar 26 can then be pulled forwardly to cause the rear buckles 20 and 22 to disengage and allow the seat to be removed from the vehicle.

Folding up the front S-shaped members 36 and 38 as described above has two advantages. Firstly, it makes the child seat 10 more compact for storage. Secondly, the transverse member 44 obstructs access to the child seat 10 when the S-shaped members 36 and 38 are in the position illustrated in FIGS. 4 and 5, and thus reduces the risk of a user merely engaging the rear buckles 20 and 22 and leaving the front buckles 58 and 50 disconnected.

FIGS. 6 to 8 illustrate the buckle 20 in more detail. A main body is formed from sheet metal bent into a U-shape so as to provide two mutually parallel side walls 110 and 112 having a transverse wall 114 extending therebetween. The ends of the side walls 110 and 112 to the right of the wall 114, as viewed in the drawings, are connected to the frame member 14 (not shown in FIGS. 6 to 8).

Each of the side walls 110 and 112 has an open-ended slot 116 extending through the end wall 118 formed by the portion of the U-shaped body interconnecting the two side walls 110 and 112. Each slot 116 has a flared outer end 120.

In use, the transverse part 32 (FIG. 3) of an anchorage unit 28 is received in the slots 116 and the flared outer part 120 assists achievement of the correct alignment during insertion.

A latch member 122 is mounted on a pivot pin 124 which extends between the side walls 110 and 112. The latch member 122 has a hook formation 126 which engages round the transverse part 32 of the anchorage unit 28. A cam surface 128 on the outer end hook part 126 displaces the hook part 126 out of the path of the transverse portion 32 during insertion.

The latch member 122 is biassed into its engaged position by a compression spring 130 which engages with the transverse wall 114. The central wire 132 of a Bowden cable 134 extends through the compression spring 130 and is connected to a transverse pin 136 on the latch member 122 so that tension in the wire 132 causes the latch member 122 to disengage (the other end of the wire being connected to the release bar 26).

An ejector 140 is mounted in the slots 116 in the side walls 112 and 114 and has a stem 142 projecting through the transverse wall 114. A compression spring 144, engages between the wall 114 and a flange 146 on the stem 142 so as to bias the ejector 140 outwardly. This ensures that the ejector 140 remains closely in abutment with the transverse part 32 of the anchorage unit 28 when the buckle is fastened (although for clarity of illustration it is shown spaced apart therefrom in FIG. 6). The ejector 140 serves to ensure that, when the latch 122 is released, the transverse part 32 is moved outwardly at least as far as the ramp part 128 of the hook 126.

The buckles 22, 58 and 60 are substantially identical to the buckle 20. The Bowden cable 134 of the buckle 22 is connected to the release bar 26. The Bowden cable 134 of each of the other two buckles 46, and 48 are connected to a common actuating member mounted on the transverse member 40.

We claim:

1. A child safety seat in combination with a vehicle, the vehicle having:
   an adult vehicle seat with a seat portion and a backrest portion,
   a rear anchorage unit rigidly secured to the vehicle at the bottom of the backrest portion of the vehicle seat, and
   a front anchorage unit rigidly secured to the vehicle below the front edge of the vehicle seat;
   the child safety seat comprising:
   a seat body,
   a rear releasable fastener projecting from the rear of the seat body for attachment to the rear anchorage unit,
   a front releasable fastener on the other end of seat body for attachment to the front anchorage unit, and
   a coupling arm having one end secured to the front releasable fastener and its other end pivotally attached to the seat body below the front thereof for angular movement between a first position in which the front releasable fastener engages with the front anchorage unit and an intermediate portion of the coupling arm is located in front of both ends thereof, and a second position in which both the front releasable fastener and said intermediate portion are located in front of the seat body so as to obstruct occupancy thereof.

2. A child safety seat in combination with a vehicle according to claim 1, wherein the coupling arm is S-shaped.

3. A child safety seat in combination with a vehicle, according to claim 1, further comprising manually operable release means for the rear releasable fastener, operation of said release means being obstructed by the coupling arm when the front releasable fastener is engaged with the front anchorage unit.

4. A child safety seat in combination with a vehicle according to claim 3, wherein the coupling arm is S-shaped.

* * * * *

Disclaimer 5,466,044—Geoffrey W. Barley, Pitton; Norman Morton, Driffield, both of England. CHILD SAFETY SEAT. Patent dated Nov. 14, 1995. Disclaimer filed Aug. 7, 1998, by the assignee, Britax-Excelsior Limited.

Hereby enters this disclaimer to claims 1-4 of said patent.

*(Official Gazette, October 20, 1998)*